United States Patent
Alcorn (10) Patent No.: US 6,971,085 B1
(45) Date of Patent: Nov. 29, 2005

(54) OBJECT ORIENTED STRUCTURED QUERY LANGUAGE (OOSQL) SUPPORT FOR ENTERPRISE JAVA BEANS

(75) Inventor: John William Alcorn, Heyworth, IL (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/653,247

(22) Filed: Aug. 31, 2000

(51) Int. Cl.[7] .................................................. G06F 9/44
(52) U.S. Cl. .................................................... 717/108
(58) Field of Search .............................. 717/107–116; 707/103 R, 104.1, 3, 107; 709/207, 217, 709/315; 719/330, 332, 315; 713/201

(56) References Cited

U.S. PATENT DOCUMENTS

| | | | |
|---|---|---|---|
| 5,899,990 A | 5/1999 | Maritzen et al. | 707/4 |
| 5,999,941 A | 12/1999 | Andersen | 707/103 |
| 6,016,499 A | 1/2000 | Ferguson | 707/104 |
| 6,032,151 A | 2/2000 | Arnold et al. | 707/103 |
| 6,044,218 A * | 3/2000 | Faustini | 717/107 |
| 6,085,198 A * | 7/2000 | Skinner et al. | 707/103 R |
| 6,529,948 B1 * | 3/2003 | Bowman-Amuah | 709/217 |
| 6,591,272 B1 * | 7/2003 | Williams | 707/102 |
| 2002/0049749 A1 * | 4/2002 | Helgeson et al. | 707/3 |

OTHER PUBLICATIONS

Codella et al., "Support for Enterprise JavaBeans in Component Broker", IBM Systems Journal, vol. 37, No. 4, 1998, pp. 502-538.*

* cited by examiner

*Primary Examiner*—Kakali Chaki
*Assistant Examiner*—Tuan Vu
(74) *Attorney, Agent, or Firm*—David A. Mims, Jr.; Rudolf O. Siegesmund (57) ABSTRACT

The invention which meets the needs of an object-oriented structured query language (OOSQL) support for enterprise Java beans is an apparatus and method for automatic generation of a portable, OOSQL query in terms of a bean's attributes and methods at the time of development. The method accomplishes its purpose by bridging between CORBA EJB, by executing an object-oriented query on an application server that returns data objects responsive to the query; adding each object returned by the server to a Java Vector object, converting the Java Vector object to a Java Enumeration; and narrowing the Java Enumeration to the EJB objects having attributes that that meet the conditions of the query.

17 Claims, 8 Drawing Sheets

OBJECT ORIENTED STRUCTURED QUERY LANGUAGE (OOSQL) SUPPORT FOR ENTERPRISE JAVA BEANS

FIELD OF THE INVENTION

The present invention relates to the coding of queries for custom finder methods in Enterprise Java Beans.

BACKGROUND OF THE INVENTION

Java is an object oriented programming language developed by Sun Microsystems, Inc.. Similar to C++, Java is smaller, more portable, and easier to use than C++ because it is more robust and it manages memory on its own. Java was also designed to be secure and platform-neutral (meaning that it can be run on any platform) through the fact that Java programs are compiled into bytecode, which is not refined to the point of relying on platform-specific instructions and runs on a computer in a special software environment known as a virtual machine. This characteristic of Java makes it a useful language for programming Web applications, since users access the Web from many types of computers. Java is used in programming small applications, or applets, for the World Wide Web, as well as in creating distributed network applications.

Java Beans are a Java component of architecture defined in the JavaBeans specification developed by Sun Microsystems (Sun). A JavaBean, or Bean, is a reusable application component—an independent code segment—that can be combined with other JavaBean components to create a Java applet or application. The JavaBean concept emphasizes the platform independence of the Java language, in which ideally a program, once written, can run on any computing platform. JavaBeans are similar to Microsoft's ActiveX controls. ActiveX controls, however, can be developed in different programming languages but executed only on a Windows platform. JavaBeans can be developed only in the Java programming language but ideally can run on any platform.

Enterprise Java Beans (EJB) are an application programming interface (API) designed to extend the JavaBean component model to cross-platform, server-sided applications that can run on the various systems usually present in an enterprise environment. Enterprise Java Beans are defined in the Enterprise JavaBean Specification released by Sun Microsystems, Inc. The goal of the API is to provide developers with a means of applying Java technology to the creation of reusable server components for business applications, such as transaction processing. An Enterprise Java Server (EJS) hosts the EJBs.

The EJB specification grew out of the Common Object Request Broker Architecture (CORBA) specification in which pieces of programs (objects) communicate with other objects in other programs, even if the two programs are written in different programming languages and running on different platforms. A CORBA program makes its requests for objects through an Object Request Broker (ORB), and thus does not need to know the structure of the program from where the object comes. CORBA is designed to work in an object oriented environment. As used herein, Object-Oriented (OO) means of, pertaining to, or being a system or language that supports the use of objects. Object, as used herein, means (in object-oriented programming) a variable comprising both routines and data that is treated as a discrete entity. The EJB specification enforced a set of standards, allowing customers to develop, in Java, completely portable server-side components independent of any one vendor's implementation.

EJBs are different from the original Java Beans. The original JavaBeans specification was geared toward enabling a variety of user interface components to be combined to produce a stand alone application (such as a stock tracking application that contains a small spreadsheet, a pie chart, and a perhaps a few other user interface components). The EJB specification is geared toward enabling distributed, transactional, secure, scalable, portable, reusable business components that allow server side components to be developed, that leverage an existing framework for addressing enterprise business concerns.

According to the EJB specification, there are two types of beans. The first type are Session Beans and the second type are Entity Beans. Session beans are generally "coordinator" type beans. Session Beans have no identity and are temporary objects whose primary purpose is to control the entity beans. Entity Beans are the beans whose data gets persisted to a database. Only Entity Beans have keys, and only Entity Beans have finder methods on their homes.

There are two types of Entity Beans. The first type is a Container Managed Persistence Bean (CMP). The application server takes care of persisting a CMP's data to the database, so that the developer doesn't have to write any code to interact with the Java Data Base Connectivity (JDBC) API (which defines a standard way of accessing a relational database from a Java Application) or any other database persistence technology. CMP is the generally recommended approach, because it is easier, and it lets the developer leverage any special capabilities of the application server, such as caching, optimistic locking, or others. The second type is a Bean Managed Persistence Bean (BMP), which requires the developer to take care of all database persistence logic. BMP is used only when the developer needs to talk to some database that the developer's application server does not support, or when the developer has other special persistence needs. CMP Entity Beans are the only type of beans where the application server gets involved in a query; therefore, further references to beans herein shall be defined as CMP Entity Beans.

The strength of the EJB spec is the framework that allows users to focus on writing code to implement their business logic, without having to worry about writing "plumbing" code such as code to persist data to a database, code to enforce security (like verifying userIDs, encrypting communciation, etc.), code to coordinate transactions, code to manage workload distribution to improve scalability, etc. The "plumbing code" is taken care of by the EJS, per the EJB specification, enabling EJBs to run on many different vendor's application servers (avoiding proprietary solutions).

In a few places in the EJB specification, Sun decided to leave it up to each vendor to decide how to implement a certain functionality, so that different vendors could come up with different solutions that allow them to differentiate themselves in the marketplace. One such place is Query (also called "Custom Finder Support")—the EJB spec simply says that, since different application servers can implement the ability to find EJBs in different ways, part of the EJB deployment process is to solicit input from the deployer as to how custom finder methods are to be implemented for the target EJB application server. Deployment is the process of taking the portable EJB and generating the necessary vendor-specific code (referred to as "Tie" code). Based on an analysis of that EJB, the Tie is generated to allow the EJB to run in a particular vendor's application server. Thus, each vendor is required to implement their own form of finder support, and to gather any necessary data from the deployer about the specific details needed to implement each custom finder method on a bean's home.

For example, an Account EJB, per the EJB spec, has a public interface that specifies the attributes of a given account (such as account number, account Holder name, and account balance), and which operations a client can invoke on a given account (such as debit, credit, transfer, and determineAvailableFunds). It also has a home interface, which specifies how a client can create a new account or find an existing account. The EJB framework requires all homes to have a findByPrimaryKey operation, which locates an instance of a specified account based on its key value, such as an account number. The EJB framework requires all persistent EJBs to have a key, which is used to uniquely identify a given instance of an EJB. Any other methods for finding an EJB, or a set of EJBs, are referred to as custom finder methods. For instance, an Account's home might also have a findLargeAccounts method, which would perform a query that finds all accounts with a balance equal to or greater than a specified amount. It would be up to the EJB deployer to specify how to perform such a query when deploying the bean to a given vendor's application server. Most application servers simply have the user specify a query using regular SQL, where the query is formed in terms of a database table name and its Column names. Moreover, most application servers require the developer to wait until deployment time to specify the implementation of the developer's custom finder methods, and such implementations require a database administrator (DBA) to tell the developer various details about how the data handled by the EJB is persisted.

Therefore, a finder helper is needed that does not require changes if the database structure changes. The finder helper needs to be portable and not specific to a given database layout. One solution meeting these needs would be a more powerful form of query expressed in object-oriented terms, where the query is formed in terms of EJB home names and EJB attribute values allowing a "finder helper" to be coded up front at EJB development time.

For example:
EJB attributes: accountNumber, accountHolderName, accountBalance
EJB methods: debit, credit, transfer, determineAvailableFunds
EJB home methods: create, findByPrimaryKey, findLargeAccounts
table name holding EJB data: ACCT
table column names: ID, CUST_NAME, ACCT_BAL Most app servers would require the developer to implement the findLargeAccounts( ) method in a vendor-specific, database-specific way, by supplying a string such as "select * from ACCT a where a.ACCT_BAL>1000". The EJB deployer (who probably knows very little about the bean or how it is persisted) would be required to know how to come up with this string, by consulting with their DBA. EJBs are portable and reusable, meaning you can take off-the-shelf beans and make use of them in your enterprise. EJBs can provide a finder helper which contains an object-oriented query that doesn't require any foreknowledge of what database table schemas will be used. This portable, OOSQL query would be in terms of the bean's attributes. For example, a query could be written as "select ref a from Account a where a.accountBalance>1000". The developer could provide this info at development time, in terms of the bean's attributes, and such info would be portable—that is, not tied to a specific persistence implementation decided by a DBA.

A further need exists for the portable SQL query. EJBs are Object-Oriented, and all objects have attributes (called instance data) and operations (called methods). Most vendors only allow queries over attributes. However, in OOSQL, you can also perform queries that involve invoking operations. In the Account example, a method called determineAvailableBalance( ) was listed. Often banks require a depositor to maintain a certain minimum balance, meaning the finds available for withdrawal may be less than the current balance. For instance, the depositor may have a balance of $1100, but your balance is not allowed to fall below $250, meaning the available balance is only $850. Thus the determineAvailableBalance( ) method is enforcing a business rule. With non OO queries, the deployer would have to know this business rule and enforce it by modifying their SQL query to be "select * from ACCT a where a.ACCT_BAL-250>1000". A need exists for a solution where the developer can provide a finder helper class with the beans, which would contain an OOSQL query like "select ref a from Account a where a.determineAvailableBalance( )>1000". OOSQL allows the developer all methods (which might perform any arbitrarily complex function), whereas SQL only lets the developer deal with the values of particular columns in a table that stores the bean's attributes. Therefore, a need exists for a solution which produces a portable, OOSQL query in terms of the bean's attributes and methods.

An exemplary embodiment of this invention is provided in Component Broker (CB), a member of the WebSphere Application Server, Enterprise Edition (WAS/EE) suite of products. CB is a CORBA based application server with EJB support. Before the advent of EJBs, CB hosted CORBA objects implemented in either C++ or Java, and provided a framework very similar to the EJB spec, called the Managed Object FrameWork (MOFW). IBM contributed heavily to the EJB spec, incorporating many of the concepts originally introduced in the MOFW. One portion of the MOFW allows for OOSQL query to be performed over the homes of CORBA objects. The present invention leverages this query functionality, bridging the CORBA and EJB worlds by enabling EJBs to leverage the query capabilities of the MOFW. Other embodiments of the invention can leverage whatever query capabilities are provided by the given application server.

To keep this invention portable (and not proprietary to WAS/EE), all of the bridging logic is encapsulated in a base class from which the desired finder helper class would inherit. To further simplify this process, a code generation tool is provided, which emits the "boiler plate" code for a finder helper class, based on examination of the home for the desired object. The developer can then simply fill in the appropriate OOSQL strings. It is important to note that such a finder helper would be portable—other app servers could make use of the finder helper by providing their own implementation of the base class containing the bridging logic specific to the particular application server.

SUMMARY OF THE INVENTION

The invention which meets the needs identified above is an apparatus and method for automatic generation of a portable, OOSQL query in terms of a bean's attributes and methods at the time of development. The method accomplishes its purpose by bridging between CORBA and EJB, by providing a Finder Helper Base class which encapsulates application server-specific logic, and by generating a finder helper subclass that contains the portable OOSQL strings.

DETAILED DESCRIPTION OF THE PREFERRED EMBODIMENT

Figure 1:
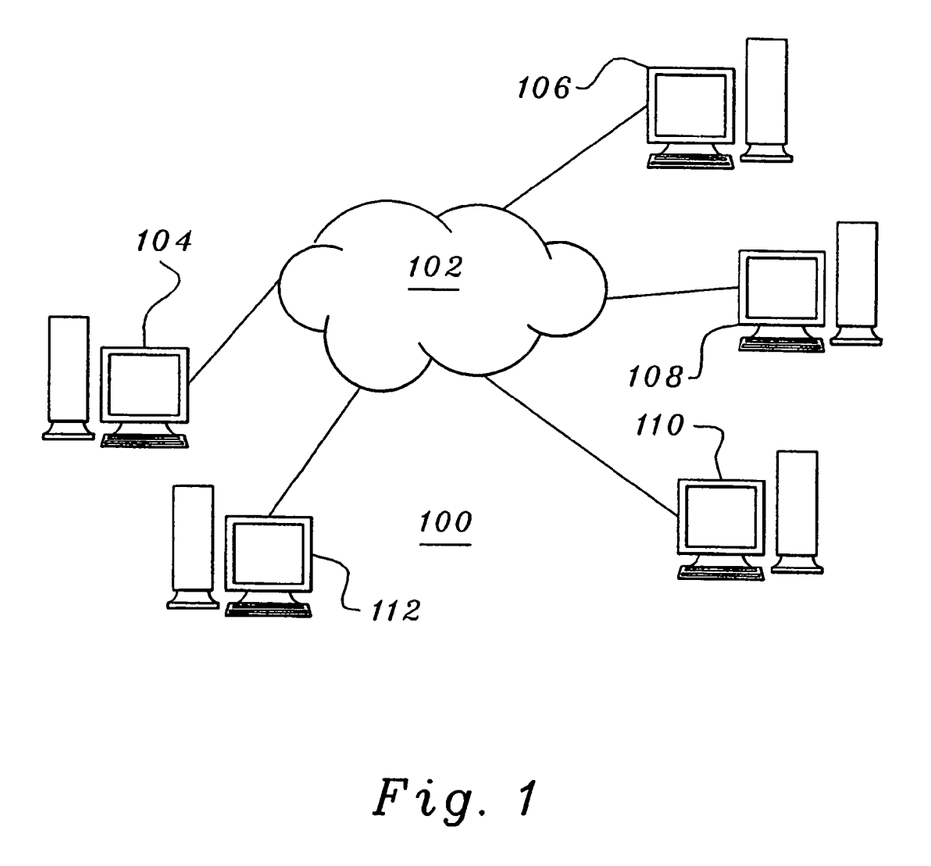
FIG. 1 depicts a distributed data processing system in which the invention may be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections, and may include personal computers or network computers.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
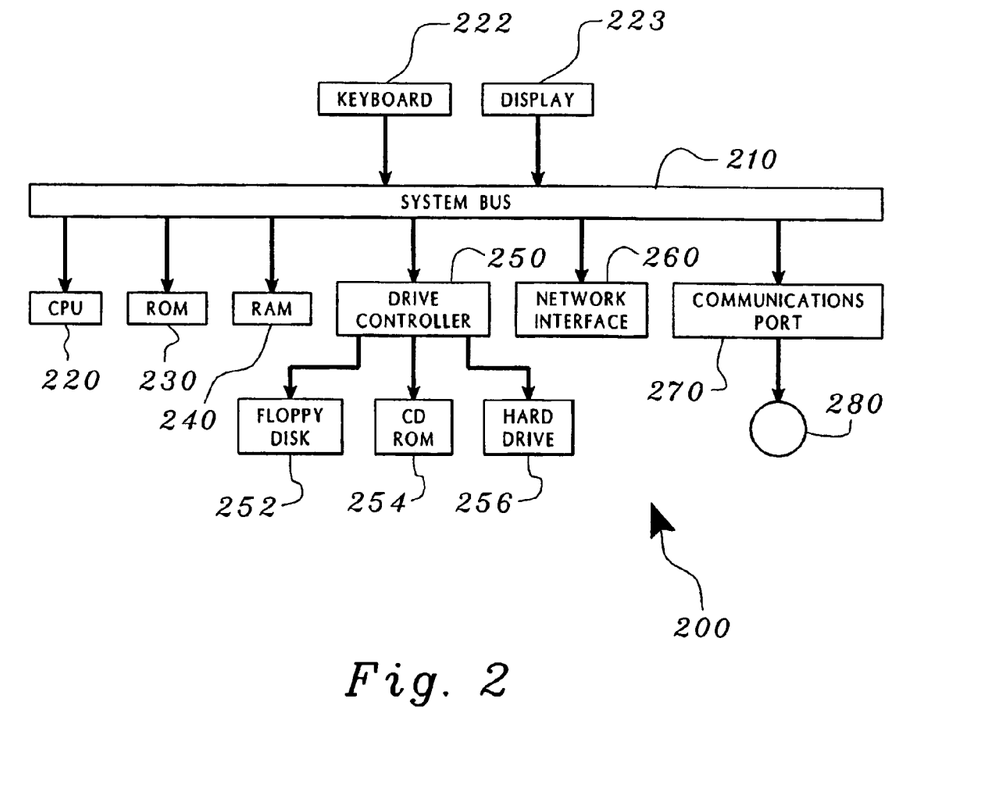
FIG. 2 depicts a computer in which the software to implement the invention may be stored.

FIG. 2 depicts Computer 200. Although the depicted embodiment involves a personal computer, a preferred embodiment of the present invention may be implemented in other types of data processing systems. An exemplary hardware arrangement for computer 200 follows. Keyboard 222 and display 223 are connected to system bus 210. Read only memory (ROM) 230 contains, typically, boot strap routines and a Basic Input/Output System (BIOS) utilized to initialize Central Processing Unit (CPU) 220 at start up. Random Access Memory (RAM) 240 represents the main memory utilized for processing data. Drive controller 250 interfaces one or more disk type drives such as floppy disk drive 252, CD ROM 254, and hard disk drive 256. The number and type of drives utilized with a particular system will vary depending upon user requirements. A network interface 260 permits communications to be sent and received from a network. Communications port 270 may be utilized for a dial up connection to one or more networks while network interface 260 is a dedicated interface to a particular network. Programs for controlling the apparatus shown in FIG. 2 are typically stored on a disk drive and then loaded into RAM for execution during the start-up of the computer.

In order to make the process of generation of a portable, OOSQL query in terms of the bean's attributes and methods at the time of development as easy as possible for the EJB developer, a tool called the FinderHelperGenerator (FHG) is created. In the preferred embodiment, the FHG is part of the software development kit (SDK) for WAS/EE. Other embodiments may be created using the methods described below. The FHG takes a portable EJB home interface and emits a "skeleton" finder helper class based on introspection of this home, where the implementation of each method is unimplemented and represented by a comment saying "Place appropriate code here" where the developer needs to insert the OOSQL query string for each custom finder method. The FHG will introspect a given EJBs home, generate a FinderHelper class (which inherits from a generated FinderHelperBase) with all of the appropriate "boiler plate" code. This generated Java file will have "Place appropriate code here" comments showing the EJB deployer where to insert the OOSQL query string. For example, a code that the FinderHelperGenerator would emit would be: return evaluate ("Place appropriate code here"); so the extent of the effort that the EJB deployer would have had to go to (and thus avoiding the need for any special knowledge of how the Component Broker Query Service is being used behind the scenes) would have been to replace the "Place appropriate code here" text with the text "accountBalance>1000".

For example:

EJB home:

```
public interface AccountHome extends EJBHome {
    public Account create(int accountNumber) throws Cre-
        ateException, RemoteException;
    public Account findByPrimaryKey(AccountKey key)
        throws FinderException, RemoteException;
    public Account findByCustomerName(String name)
        throws FinderException, RemoteException;
    public Enumeration findLargeAccounts( ) throws Finder-
        Exception, RemoteException;
}
```

Generated Finder Helper class:

```
public class AccountFinderHelper extends FinderHelper-
Base {
    public AccountFinderHelper(IHome home) {
        super(home);
    }
    public Object findByCustomerName(String name) throws
        FinderException, RemoteException {
        return singleEvaluate("Place appropriate code here");
    }
    public Enumeration findLargeAccounts( ) throws Finder-
        Exception, RemoteException {
        return evaluate("Place appropriate code here");
    }
}
```

Notice that besides the constructor at the beginning, there are two methods—one that returns a single object based on the customer's name, and one that returns a set of Objects (called an "Enumeration" in Java terminology) whose account balances are above a certain threshold. The developer would then have to replace the "Place appropriate code here" strings with the actual query strings, such as "customerName="+name for the first one, and "balance>11000" for the second one (assuming the EJB attribute names were customerName and balance—note that we don't need to know any database table names or column names).

Figure 3:
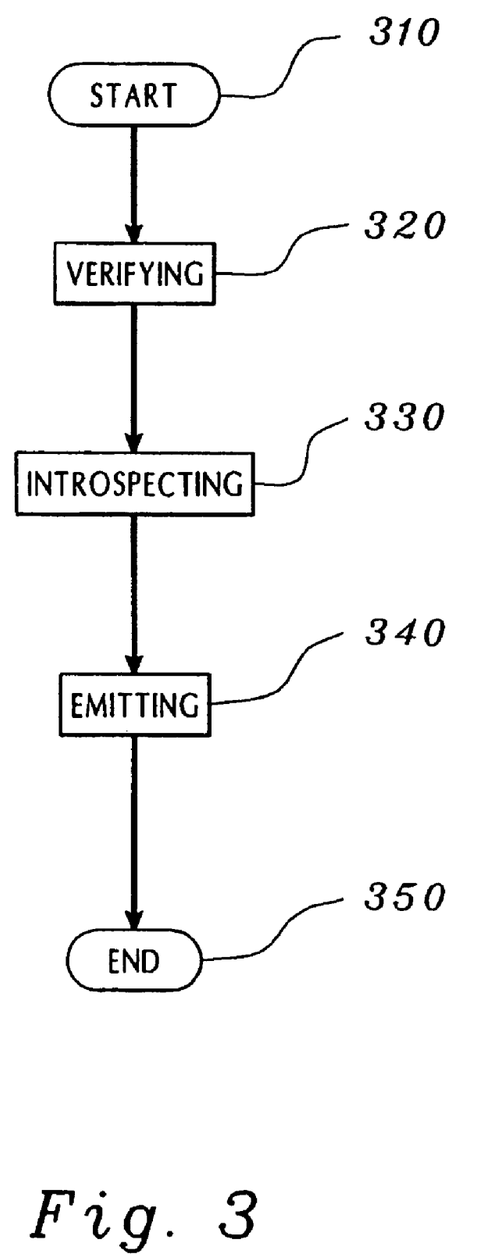
FIG. 3 is a flow chart of the FinderHelperGenerator process.
Figure 4:
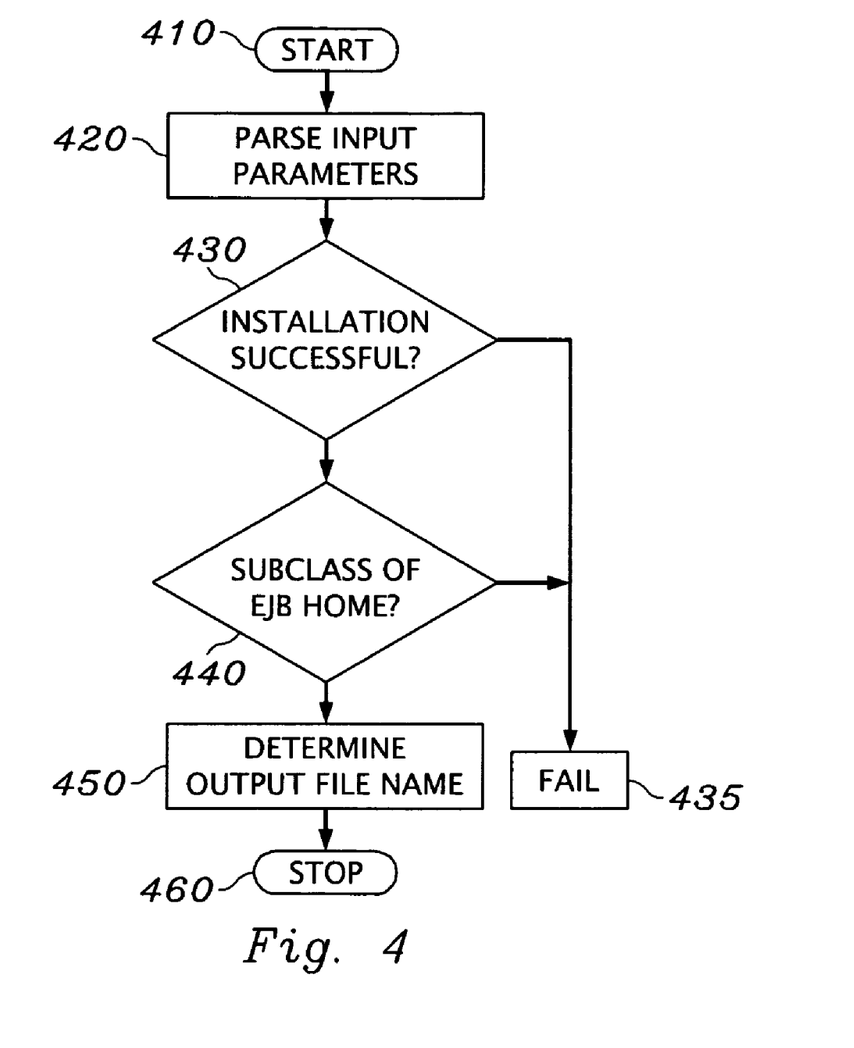
FIG. 4 is a flow chart of the Verifying step of the FHG process.
Figure 5:
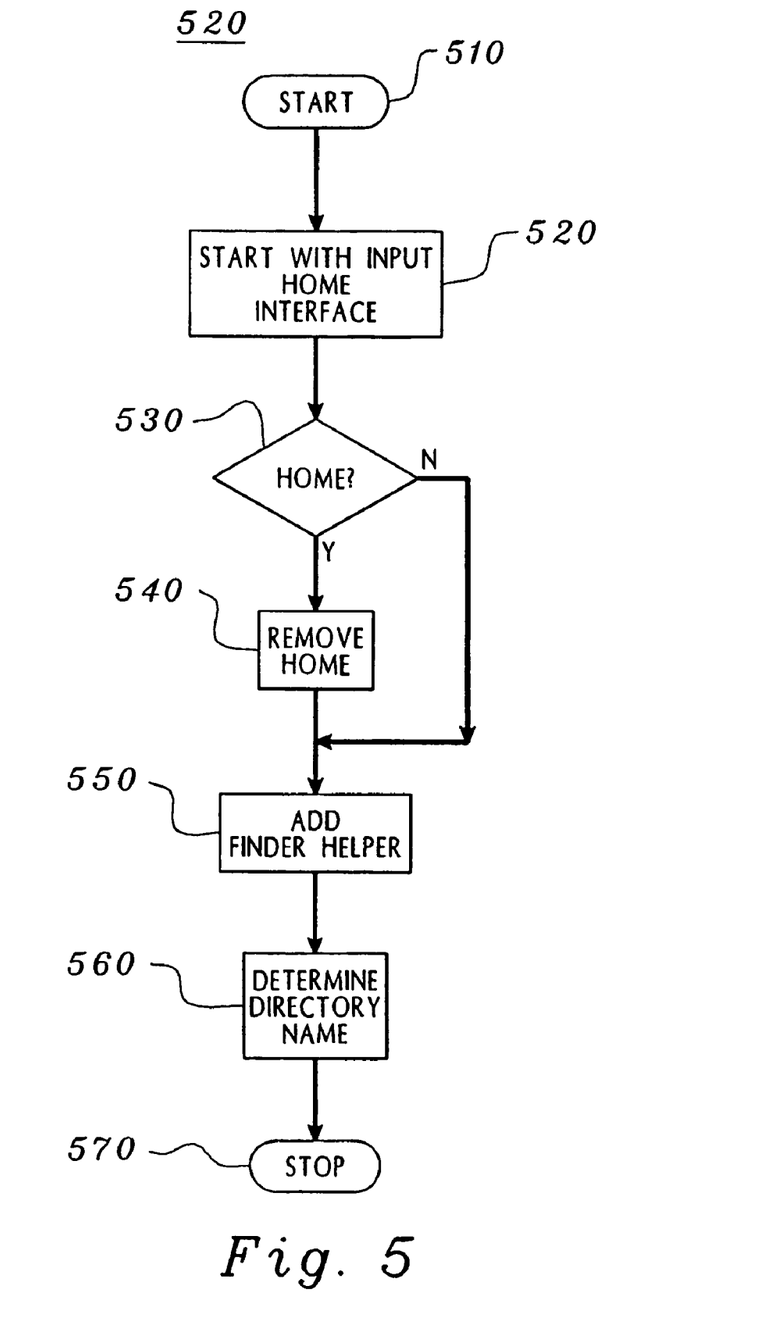
FIG. 5 is a flow chart of the Determination step of the Verifying Step of FIG. 4.

FIG. 3 depicts the FHG method (300) which involves the steps of verifying (320), introspecting (330) and emitting (340). The verifying step (320) involves the following substeps which are detailed in FIG. 4. First, input parameters are parsed (420). Second, verification is made that the specified Java class can be successfully instantiated (430) and that it is indeed a subclass of EJBHome (440). If the specified Java class cannot be successfully instantiated, then the specified Java class fails (435). If the specified Java class is not a subclass of EJBHome, the specified Java class fails (435). As used herein, instantiate means to create an instance of a class. Third, the output file name is determined (450). Determination of the output file name is accomplished by the following sub steps as shown in FIG. 5. Start with the input EJB home interface name (520). The suffix "Home" (if it exists) (530) is removed (540). The suffix "FinderHelper"is added (550). The directory name for the file is determined based on the package name (560). For example, an input of com.mycompany.myproject.AccountHome produces a file named AccountFinderHelper in the com/mycompany/myproject directory.

Figure 6:
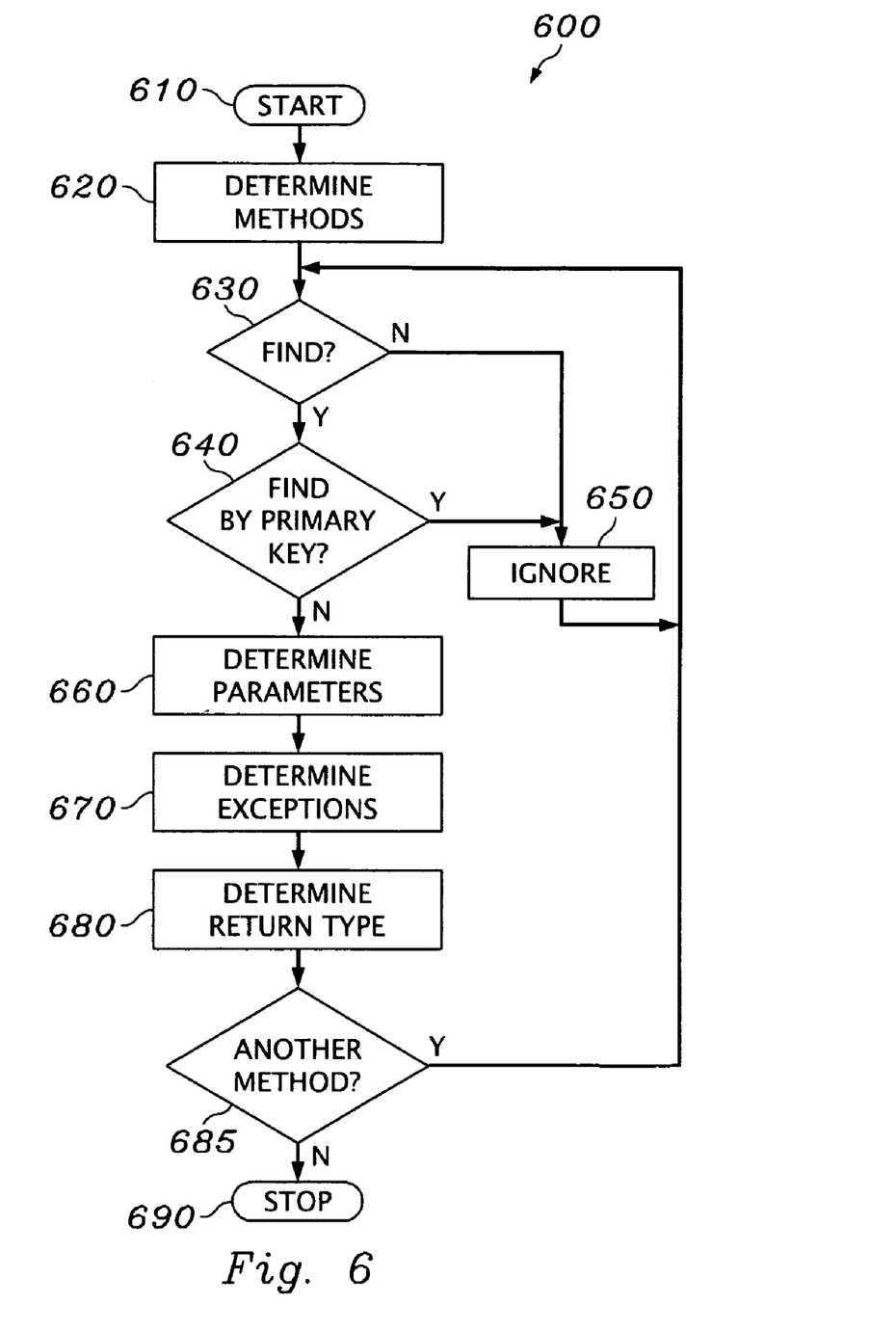
FIG. 6 is a flow chart of the Introspecting step of the FHG process.

The Introspecting step(320 of FIG. 3) involves the following substeps as shown in FIG. 6. First, using Java Reflection, the methods of the specified input home interface are determined (620). All methods except those which start with the string "find" are ignored (the EJB specification requires all finder methods to start with "find") (630 and 650). The term "findByPrimaryKey"is ignored (640 and 650). The parameters expected by each qualifying method are determined (660). The exceptions each qualifying method can raise are determined (670). The return type of each qualifying method is determined (680). The process repeats until all methods found in step 620 have been addressed (685).

Figure 7:
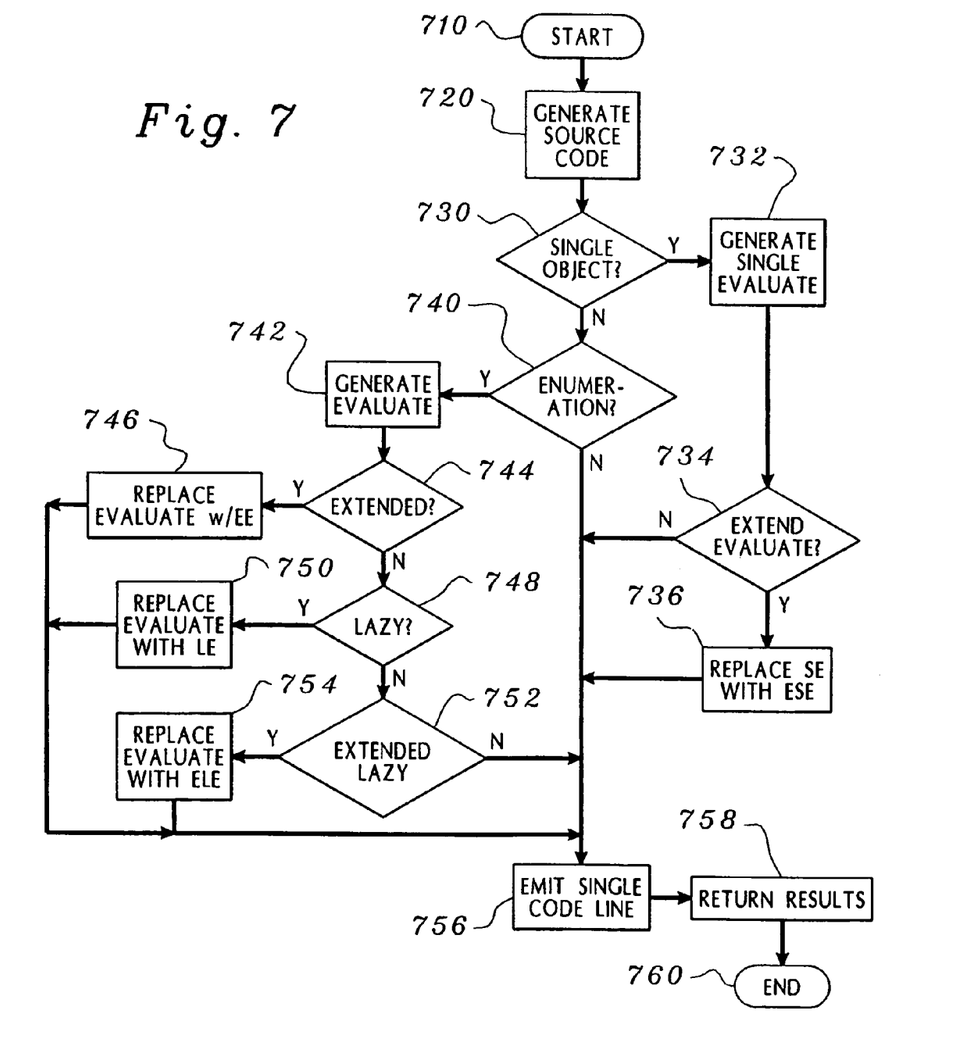
FIG. 7 is a flow chart of the Emitting step of the FHG process.

The emitting step (340 of FIG. 3) involves the following substeps as shown in FIG. 7. First, the source code for a Java class is generated (720). The source code includes a package statement, appropriate import statements, the public class definition specifying the inheritance from FinderHelperBase, the constructor, and each of the methods which qualified from the introspection step. A determination is made whether the finder method is defined to return a single object (730). If a determination is made that the finder method is defined to return a single object, then singleEvaluate ( ) is generated (732). Next, a determination is made whether the user wants to change singleEvaluate ( ) to extendedSingleEvaluate ( ) (734). If the user wants to change singleEvaluate ( ) to extendedSingleEvaluate ( ), then extendedSingleEvaluate ( ) is generated, singleEvaluate ( ) is replaced, and the program goes to step 756. If a determination is made that the user does not want to change singleEvaluate ( ) to extendedSingleEvaluate ( ), the program goes to step 756 (singleEvaluate ( ) has already been generated in step 732).

If a determination is made that the finder method is not defined to return a single object, then a determination is made whether the finder method is defined to return an Enumeration of objects. If a determination is made that the finder method is defined to return an Enumeration of objects, then evaluate ( ) is generated (742). If evaluate ( ) is generated, a determination is made whether the user wants to change evaluate ( ) to extendedEvaluate ( ) (744). If the user wants to change evaluate ( ) to extendedEvaluate, then extendedEvaluate is generated, replaces evaluate ( ) (746) and the program goes to step 756. If the user does not want to change evaluate ( ) to extendedEvaluate ( ), then a determination is made whether the user wants to change evaluate ( ) to lazyEvaluate ( )(748). If the user wants to change evaluate ( ) to lazyEvaluate, then lazyEvaluate ( ) is generated, replaces evaluate ( ) ( ) and the program goes to step 756. If the user does not want to change evaluate ( ) to lazyEvaluate ( ), then the program determines whether the user wants to change evaluate ( ) to extendedLazyEvaluate ( ). If the user wants to change evaluate ( ) to extendedLazyEvaluate ( )(752), then extendedLazyEvaluate ( ) is generated, replaces evaluate ( ) (754) and the program goes to step 756. If the user does not want to change evaluate ( ) to extendedLazyEvaluate ( ), then the program goes to step 756 (evaluate ( ) has already been generated in step 742).

For each of the qualified methods, a single line of code is emitted (756). The single line of code has the method return the results of invoking the desired variation of evaluate( ) from the FinderHelperBase class (758). For example, the evaluate( ) method takes a single input parameter which is an OOSQL predicate and the FinderHelperGenerator emits a string which says "Place appropriate code here", which the user will need to replace with the appropriate OOSQL predicate.

Methods that start with "extended" require the full OOSQL string (such as "SELECT ref a from Account a WHERE a.balance>1000"), whereas the methods that don't start with "extended" require only the OOSQL predicate string (such as "balance>1000"). The simplest form of method is evaluate ( ), which performs the query based on the OOSQL predicate, iterates over the results, and returns the desired Enumeration of EJBs. The method extendedEvaluate ( ) would be useful for a query that involves multiple EJB types, such as "select ref a from Account a, Customer c where c.name='John' and c.id=a.customerId", which is a query over both Accounts and Customers (which handles the case where the Account bean only holds a reference (referred to as a "foreign key") to a Customer bean, rather than directly holding the customer name—this style is very common with relational databases.

The "lazy" methods return demand-driven iterators using lazy evaluation. The "non-lazy"methods perform the full evaluation up front. The "lazy" form defers iterating over the result set until needed, only instantiating each EJB as requested (in the industry this practice is referred to as "lazy initialization"), and is useful when very large result sets may be received, since memory is allocated "on demand", rather than all up front. The tradeoff is that the query returns faster, but it takes longer to iterate over the result set.

The "single" form is for finder methods that are defined to only return a single object, such as our findByCustomerName example (which assumes customer names are unique—a quality referred to in the industry as a "secondary unique key").

The psuedo-code for the evaluate ( ) method is as follows:

Enumeration results=null;

try{
  IManageable obj=null;
  Vector vector=new Vector( );
  IIterator iter=IQueryableIterableHome.evaluate(oosqlString);
  while (iter.more( )) {
    obj=iter.next( );
    vector.addElement(obj);
  }

```
results=vector.elements( );
return results;

} catch (Exception e) {
  throw new FinderException(e.toString( ));
}
```

The FHG depends on the FinderHelperBase (FHB) utility class and generates a FinderHelper (FH) class. The FH class is a Java class with a constructor that takes the bean's home as input (in MOFW terms, such a home is called an IHome, from the com.ibm.IManagedClient package), and with a method for each custom finder method in the EJB's home. For instance, if an Account EJB has a home (AccountHome) with one or more create methods, a findByPrimaryKey method (all EJBs are required to have one of these), and two other "custom" finder methods, such as findLargeAccounts and findByCustomerName, the finder helper would have a constructor and those last two methods.

The FHB class is a utility class that does the bridging between the EJB world and the CORBA world, to aid the developer, and also, to keep the finder helper portable. Each application server provides its own implementation of FinderHelperBase. For example, WAS/EE makes calls into the CB MOFW. The FinderHelperBase class is provided specifically to enable the capabilities of the invention. This class contains the implementation of the "bridging code," that performs the actual CORBA based OOSQL queries, and then iterates through resulting MOFW based objects and builds a corresponding Java Enumeration of EJB objects that meet the conditions of the query. For example, in the WAS/EE implementation, the FHB class is a runtime class which takes the specified OOSQL strings, passes them to the CB query service, then iterates over the result set of generic CORBA objects and produces the expected result set of EJBs. In CORBA terminology, a generic class is turned into a more specific kind of class via what is called a "narrowing" operation, in which a request is made from the client to the server, asking it if it really is the specified subclass—if so, the narrow is successful—otherwise, an exception is generated. For example, in MOFW terms, such an object is called an IManageable, from the com.ibm.IManagedClient package. Each IManageable has to be narrowed to the appropriate EJB (which, in CB, is implemented as a subclass of IManageable which implements the EJB's remote interface, thus allowing it to be referred to by the interface name). In order to keep the FinderHelperBase generic (rather than having to generate a specific one for each EJB), the generated EJB Tic (that actually calls the finder helper method in the first place) does the narrow.

Figure 8:
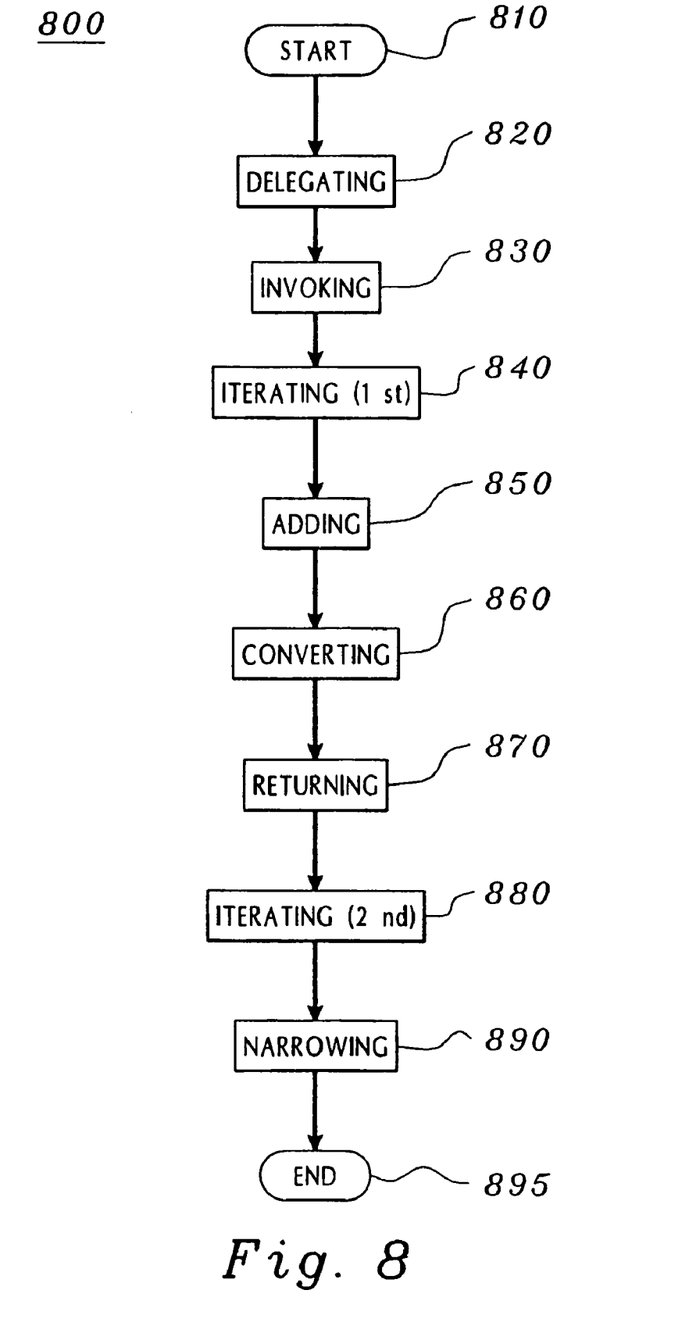
FIG. 8 is a flow chart of the bridging logic in the Finder Helper Base.

FIG. 8 depicts the process of using the FHB utility class when performing a query (800). The steps are delegating (820), invoking (830), iterating (first) (840), adding (850), converting (860), returning (870), iterating (second) (880) and narrowing (890). The delegating step (820) commences when a custom finder method is invoked and the Tie delegates to the finder helper class.

The invoking step (830) involves making use of the query capabilities of the underlying application server. In the CB case this means calling the evaluate( ) or extendedEvaluate ( ) methods of the IQueryableIterableHome class.

The iterating (first) step (840) involves accessing each object in the set returned from the invoking step. These objects are CORBA objects, not EJBs. The Tie takes care of narrowing the generic CORBA objects down to the specific type of EJB in narrowing step.

The adding step (850) involves keeping track of each object accessed in the invoking step by temporarily storing each of them in a Vector. A Vector is used since it is not known how may objects are going to be returned from the query.

The converting step (860) uses a method on the Vector class called "elements ( )", which creates an Enumeration out of the Vector that was built up in the adding step. The EJB 1.0 specification requires all finder methods that return multiple objects to do so in an Enumeration.

The returning step (870) involves the finder helper returning the Enumeration from the converting step to the Tie.

The iterating (second) (880) step is an iteration over the portable Enumeration class returned by the finder helper. In the preferred embodiment, the iteration performed in Iterating (first) step was over a CB MOFW class called IIterator. By the time control returns to the Tie, the application server specific details of performing the query are already dealt with. The Tie accesses each object stored within the portable, EJB specification required Enumeration class. All application server specific details of how the query is actually performed are taken care of by the finder helper (and its superclass, the FinderHelperBase class.).

The narrowing step (890) involves using the standard PortableRemoteObject.narrow( ) operation, which is the portable means of downcasting a remote object to a more specific kind of object (in this case, the EJB). The PortableRemoteObject class is part of the javax.rmi package, which is part of the RMI-over-IIOP specification. Application server specific code is avoided by staying with portable code after return from the call to the finder helper class.

The desired EJBs are the EJBs that meet the specified query conditions.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of building Enterprise Java Bean objects that meet conditions of an object-oriented query comprising the steps of:
   executing an object-oriented query on an application server such that the application server returns data objects responsive to the query;
   adding each data object returned by the application server to a JAVA Vector object;
   converting the JAVA Vector object to a JAVA Enumeration; and
   narrowing the JAVA Enumeration to Enterprise Java Bean objects having attributes that meet the conditions of the object-oriented query.

2. The method of claim 1 wherein the application server comprises a Managed Object Framework for processing the object-oriented query.

3. The method of claim 2 wherein the execution step comprises calling the evaluate( ) method of an IQueryableIterableHome object in the Managed Object Framework.

4. The method of claim 2 wherein the execution step comprises calling the extendedEvaluate( ) method of an IQueryableIterableHome object in the Managed Object Framework.

5. The method of claim 1 wherein the converting step comprises calling a method of the JAVA Vector object that creates the JAVA Enumeration.

6. The method of claim 1 wherein the narrowing step comprises calling a PortableRemoteObject.narrow( ) method in order to avoid application server specific code.

7. The method of claim 1 wherein the application server is a CORBA application server.

8. The method of claim 7 wherein the data objects are CORBA data objects.

9. A programmable apparatus for building Enterprise Java Bean objects that meet conditions of an object-oriented query, the programmable apparatus comprising:
   a processor;
   a memory;
   an application server program in the memory;
   means for directing the application server to evaluate the object-oriented query and return data objects responsive to the query;
   means for directing the processor to add each data object returned by the application server to a JAVA Vector object;
   means for directing the processor to convert the JAVA Vector object to a JAVA Enumeration; and
   means for directing the processor to narrow the JAVA Enumeration to Enterprise Java Bean objects having attributes that meet the conditions of the object-oriented query.

10. The programmable apparatus of claim 9 wherein the application server comprises a Managed Object Framework for evaluating the object-oriented query.

11. The programmable apparatus of claim 9 wherein the application server is a CORBA application server.

12. The programmable apparatus of claim 11 wherein the data objects are CORBA data objects.

13. A computer-readable memory for causing a computer to build Enterprise Java Bean objects that meet conditions of an object-oriented query, the computer-readable memory comprising:
   a computer-readable storage medium; and
   a program stored in the storage medium that causes the computer to
      evaluate the object-oriented query and return data objects responsive to the query, add each data object returned by the application server to a JAVA Vector object, convert the JAVA Vector object to a JAVA Enumeration, and
   narrow the JAVA Enumeration to Enterprise Java Bean objects having attributes that meet the conditions of the object-oriented query.

14. The computer-readable memory of claim 13 further comprising an application server program in the storage medium for evaluating the object-oriented query.

15. The computer-readable memory of claim 14 wherein the application server comprises a Managed Object Framework for evaluating the object-oriented query.

16. The computer-readable memory of claim 14 wherein the application server is a CORBA application server.

17. The computer-readable memory of claim 16 wherein the data objects are CORBA objects.

* * * * *

UNITED STATES PATENT AND TRADEMARK OFFICE
CERTIFICATE OF CORRECTION

PATENT NO.    : 6,971,085 B1
DATED         : November 29, 2005
INVENTOR(S)   : Alcorn It is certified that error appears in the above-identified patent and that said Letters Patent is hereby corrected as shown below:

Column 4,
Line 12, "finds" should be -- funds --.

Column 7,
Line 3, "11000" should be -- 1000 --.

Column 9,
Line 21, "EIB" should be -- EJB --.
Line 52, "Tic" should be -- Tie --.

Signed and Sealed this

Seventh Day of March, 2006

JON W. DUDAS
*Director of the United States Patent and Trademark Office*